United States Patent
Price

[11] 3,709,345
[45] Jan. 9, 1973

[54] DOUBLE PASSAGE SILO CHUTE
[75] Inventor: Raymond R. Price, Rochester, Minn.
[73] Assignee: Rochester Silo Co., Rochester, Minn.
[22] Filed: July 28, 1971
[21] Appl. No.: 166,679

[52] U.S. Cl. ................193/34, 214/17 DB, 52/195, 52/196
[51] Int. Cl. ......................B65g 11/02, B65g 65/36
[58] Field of Search..................193/4, 29, 33, 34, 5; 52/195, 196; 214/17 DB

[56] References Cited

UNITED STATES PATENTS

| | | | |
|---|---|---|---|
| 3,251,292 | 5/1966 | Vaughan | 214/17 DB X |
| 1,184,385 | 5/1916 | Schlafly | 193/34 X |
| 2,735,591 | 2/1956 | Branchflower | 214/17 DB X |
| 1,329,801 | 2/1920 | Schaffner | 193/34 X |
| 1,173,074 | 2/1916 | Williams | 52/195 X |

Primary Examiner—Evon C. Blunk
Assistant Examiner—W. Scott Carson
Attorney—H. Dale Palmatier et al.

[57] ABSTRACT

A silo chute having a vertical dividing wall extending over substantially its entire length and separating the interior of the chute into a service and access passage through which access may be obtained to the interior of the silo through vertically spaced door openings therein and an ensilage passage through which ensilage is discharged from the silo. A plurality of vertically spaced discharge openings in one wall of the ensilage discharge passage are normally closed by doors which may be selectively opened to place the discharge passage in flow communication with the interior of the silo at a level corresponding to the level of ensilage therein.

11 Claims, 9 Drawing Figures

PATENTED JAN 9 1973

INVENTOR.
RAYMOND R. PRICE

BY Williamson Palmatier
& Bains ATTORNEYS

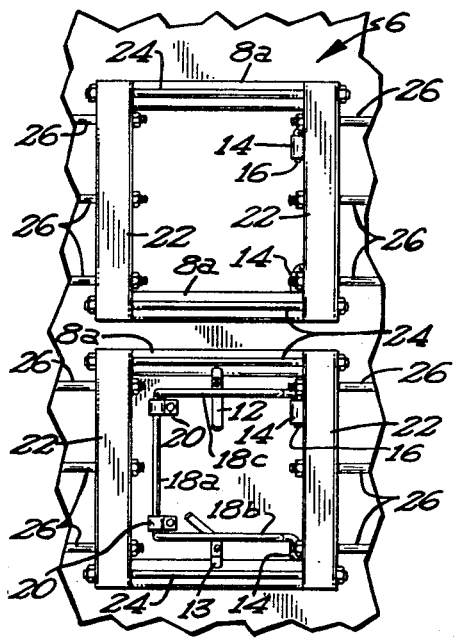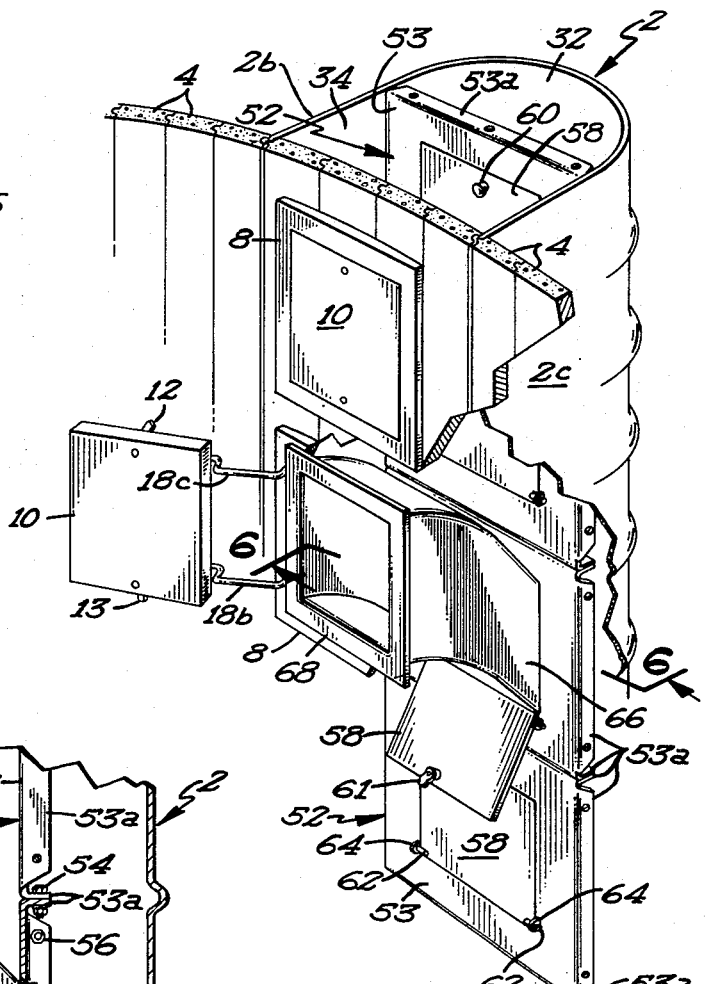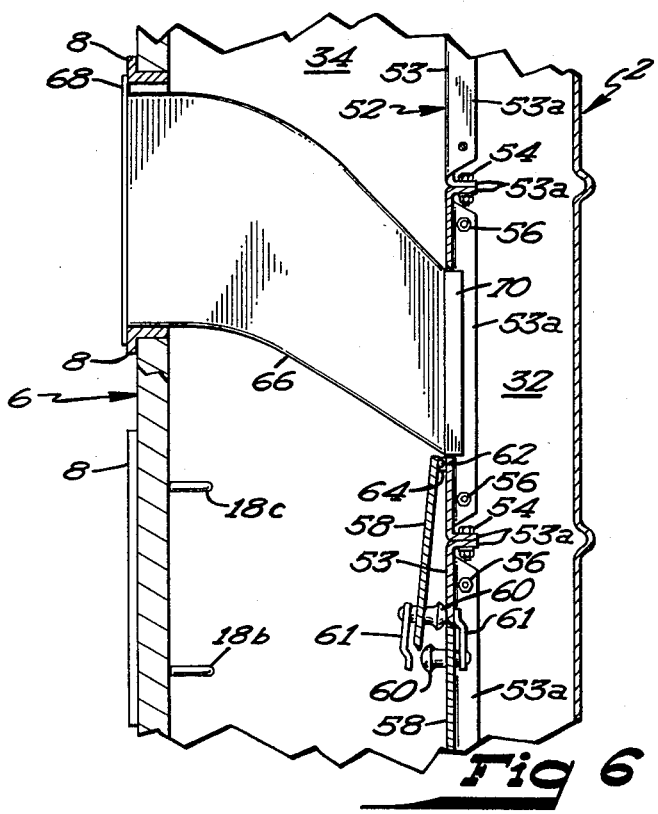

PATENTED JAN 9 1973
3,709,345
SHEET 3 OF 3
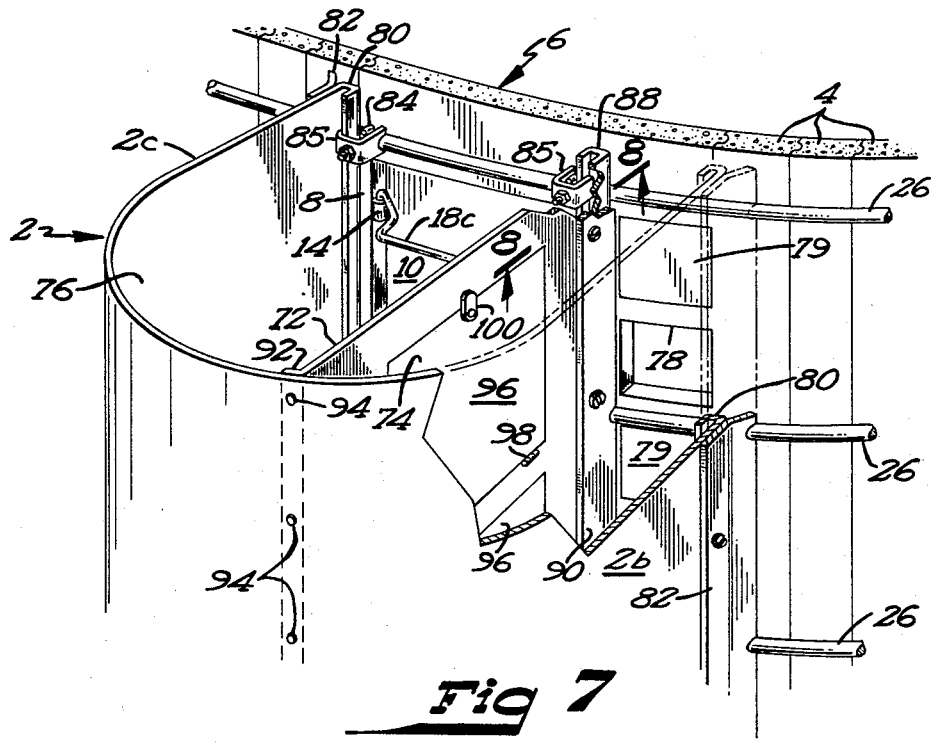
Fig 7
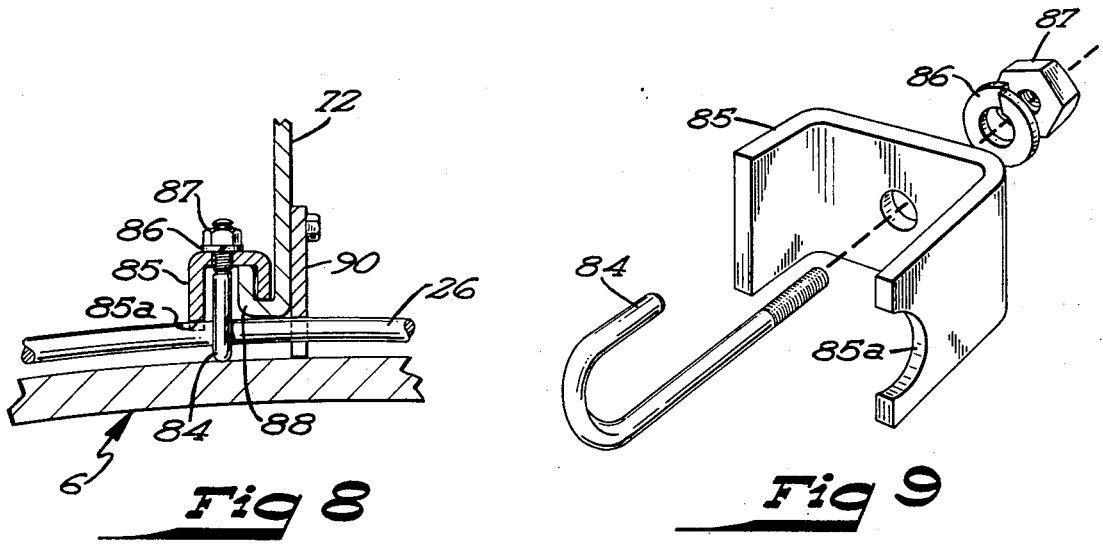
Fig 8
Fig 9
INVENTOR.
RAYMOND R. PRICE
BY Williamson Palmatier
& Bains ATTORNEYS

DOUBLE PASSAGE SILO CHUTE

BACKGROUND OF THE INVENTION

In the usual construction of silos, an upright chute is provided against one wall of the silo for the purpose of providing access to the interior of the silo as well as for discharging ensilage. It is normal practice to utilize a plurality of vertically spaced openings in the wall of the silo embraced by the chute to permit a person to get inside of the silo at the level of ensilage therein for various purposes such as servicing and adjusting a mechanical unloader used for forced discharge of ensilage. This type of silo chute structure wherein a single chute passage serves as both an ensilage discharge passage and an access passage suffers from the disadvantage that the interior of the chute, and particularly the ladder rungs inside of the chute used for reaching the silo wall access openings at the desired elevation, become coated with accumulations of forage and grains. This material is sticky and dirty by nature, and becomes quite gummy in hot wheather. As a result, the ladder rungs in the silo chute which must be used as steps and hand holds and the interior wall surfaces of the chute become sticky and dirty, thereby rendering the combined access and ensilage passage of the silo chute extremely objectionable and difficult to move through as an access passage. This problem is overcome in the improved chute structure of this invention by forming separate access and discharge passages in a silo chute so as to maintain a relatively clean access passage.

BRIEF SUMMARY OF THE INVENTION

This invention has as its basic objective the provision of a silo chute having one passage for the discharge of ensilage from a silo, and a second, separate passage through which ensilage does not flow, and which is maintained as a clean access passage within which a workman may climb on ladder rungs to reach access doors in a silo wall over which the chute is mounted.

This primary objective is realized by a silo chute structure particularly characterized by an elongated, substantially U-shaped housing member having an elongated dividing wall extending between opposed wall segments thereof over substantially the entire length of said chute and separating the interior of the aforesaid housing member into an ensilage discharge passage and a service passage of sufficient cross-sectional area to accommodate a man, and a plurality of vertically spaced discharge openings in one wall segment of the discharge passage through which ensilage may be directed from the silo into the discharge passage at selected elevations corresponding to the level of ensilage in the silo. Each of the discharge openings is normally closed by a door or panel which may be moved to an open position for the purpose of placing the discharge passage in flow communication with the interior of the silo. When erected in an upright position on a silo wall, the aforesaid U-shaped housing member is disposed in overlying relation to a plurality of vertically spaced access openings in one, upright wall of the silo, the aforesaid access passage being so disposed with respect to the silo wall that the silo access openings are located within the confines of the access passage. Ladder rungs on an upright wall of the access passage permit a person to climb up inside the access passage to obtain entry to the interior of the silo through one of the aforesaid access openings.

In one embodiment of the double passage silo chute, the aforesaid dividing wall is oriented substantially parallel to the side wall portion of the silo within which the vertically spaced silo access openings are formed, the dividing wall cooperating with the outer, remote end wall of the aforesaid U-shaped housing member to define the ensilage discharge passage, and the access passage being formed immediately adjacent the silo between the chute dividing wall and the aforesaid side wall portion of the silo containing the silo access doors. With this particular chute structure, the vertically spaced discharge openings in the discharge passage are formed in the dividing wall opposite the vertically spaced access openings in the silo wall, and conduit means is selectively positioned between one of the silo access openings and one of the discharge openings for conducting ensilage from the interior of the silo across the access passage and into the discharge passage at a desired elevation. A separate tubular conduit of such a length as to extend across the access passage may be removably utilized as the aforesaid conduit means for conducting ensilage from the interior of the silo to the discharge passage. Alternatively, door panels hinged on horizontal axes over the discharge openings in the dividing wall may be swung to open positions wherein they serve as conduit defining members to contain and direct ensilage discharging from the silo into the discharge passage.

In an alternative embodiment of the chute structure, the aforesaid dividing wall may be disposed in the upright, U-shaped housing member in a position wherein it is substantially perpendicular to one side wall portion of the silo in which a plurality of vertically spaced access openings are formed. With this dividing wall arrangement, both the discharge passage and the access passage within the silo chute will have a vertical wall segment common with the one side wall portion of the silo in which the silo access openings are formed, and the plurality of discharge openings in the discharge passage are formed in the same side wall portion of the silo as that in which the silo access openings are formed with the two sets of openings being horizontally spaced apart and adjacent to each other.

These and other objects and advantages of my silo chute invention will become readily apparent as the following description is read in conjunction with the accompanying drawings wherein like reference numerals have been used to designate like elements throughout the several views.

BRIEF DESCRIPTION OF THE DRAWINGS

FIG. 4 is a fragmentary, vertical section view taken along lines 4—4 of FIG. 1;

FIG. 5 is a perspective view, partially broken away, showing a second embodiment of the double passage silo chute;

FIG. 6 is a vertical section view taken along lines 6—6 of FIG. 5;

FIG. 7 is a perspective view, partially broken away, of another embodiment of the double passage silo chute;

FIG. 8 is a fragmentary, top, plan view showing the connection between the chute dividing wall of FIG. 7 and the silo wall; and FIG. 9 is an exploded, perspective view showing the dividing wall coupling means of FIG. 8.

DESCRIPTION OF THE PREFERRED EMBODIMENTS

Figure 1:
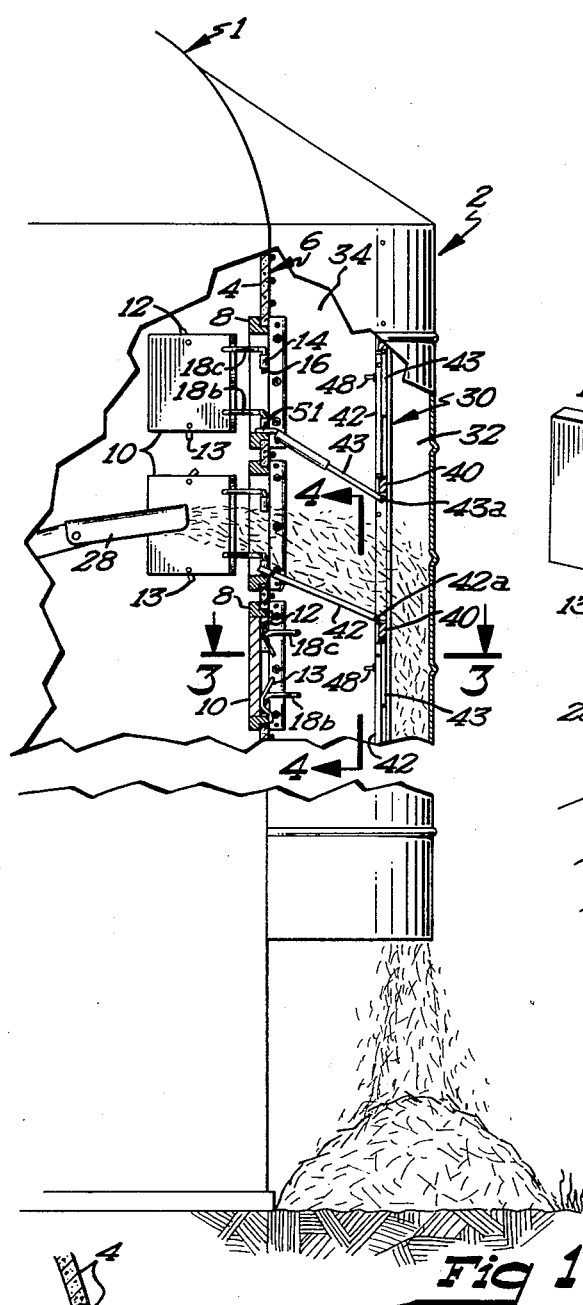
FIG. 1 is a side elevation view, partially in section, showing one embodiment of the double passage silo chute of this invention.
Figure 2:
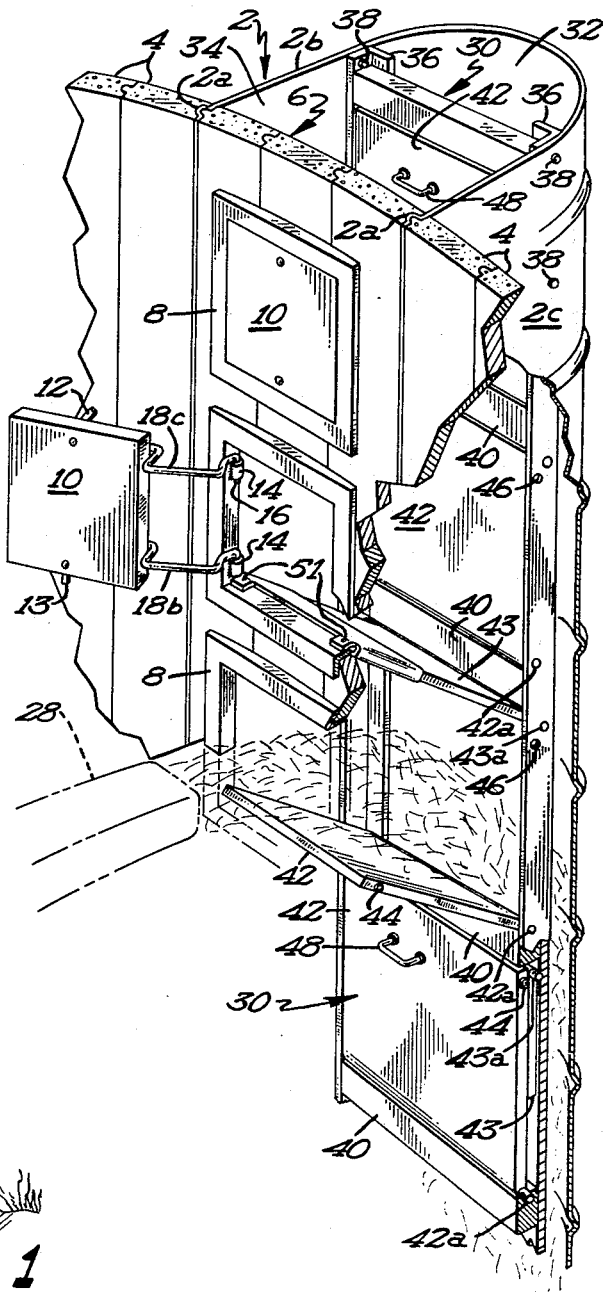
FIG. 2 is a perspective view, partially broken away, of the silo chute structure of FIG. 1.
Figure 3:
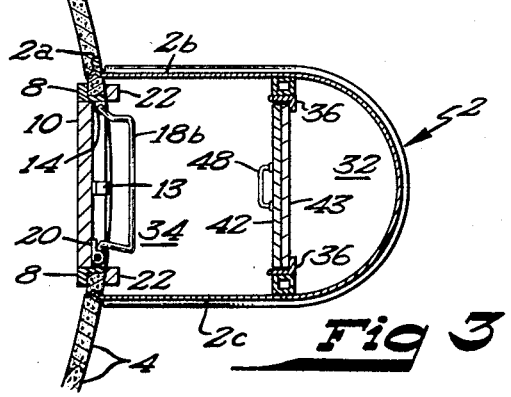
FIG. 3 is a horizontal section view taken along lines 3—3 of FIG. 1.

Referring now to the embodiment of the double passage silo chute shown in FIGS. 1 through 4, I have indicated generally by reference numeral 1 a silo of standard construction on which the double passage silo chute of this invention has been mounted. Upright silo 1 is comprised of a plurality of interlocking staves 4 assembled in a well known manner utilizing tongue and groove joints. Staves 4 may be formed from various materials, including concrete, as illustrated herein. In one upright side wall portion of silo 1, generally indicated by reference numeral 6, there is provided a plurality of vertically spaced door frame openings 8 disposed in vertical alignment with each other. Each of the door openings 8 is normally covered or enclosed by a door 10 which may be mounted in various ways to be removable or shiftable to an open position. In the embodiments of the silo and chute structure disclosed herein, silo doors 10 are shown hingedly mounted for swinging movement about vertical axes from a closed position to an inwardly swung, open position. As is illustrated in FIGS. 1 and 2, doors 10 swing into silo 1 when they are opened. Doors 10 are held in a normally closed position by a pair of pivotal latches 12, 13 at the top and bottom thereof which are pivotal into locking engagement with transverse frame members 8a of door frames 8 in the manner shown in FIG. 4. A pair of vertically spaced hinge sleeves 14 mounted on one of the upright frame members of each door frame assembly 8 serve to pivotally support vertically extending hinge segments 16 of a unitary, bar assembly 18 of substantially C-shaped secured to the front face of each door 10 by mounting brackets 20. Sleeve type mounting brackets 20 are secured over vertically extending segments 18a of hinge bar assembly 18 on each door 10. Horizontally extending bar segments 18b and 18c serve as ladder rungs, and form together a continuous, vertically extending ladder by means of which a workman may ascend chute 2 to obtain entry to the interior of silo 1 by unlatching one of the doors 10 and swinging it inwardly. Each of the door frames 8 is reinforced by a pair of vertically extending channel frame members 22 disposed along opposite sides of the door frame. Channel frame members 22 are interconnected by cross bar bolts 24. Upright channel members 22 also serve as attachment means for hoop rods 26 which extend around the outside surface of silo 1 at vertically spaced locations thereon to strengthen the silo to sustain maximum pressures. Hooping, which is known in the silo construction field, is made uniform over the entire height of silo 1 by the use of channel frame members 22 as attachment means for the hoop rods.

Silo chute 2 may be attached to an upright side wall of silo 1 in a variety of ways. For purposes of illustrative convenience, we have shown silo chute 2 locked in engagement with upright silo wall 6 by means of vertically extending tongues 2a on the inner, upright edges of chute 2. Silo chute tongues 2a are firmly sandwiched in place between mating tongue and groove joints of adjacent silo staves 4 on opposite sides of door frames 8 in the manner shown in FIGS. 2 and 3. Ensilage is discharged under pressure from the interior of silo 1 into silo chute 2 by means of a mechanical unloader of known construction and operation having a discharge chute 28 through which ensilage is blown through one of the open service doors 10 in the manner shown in FIG. 1, at a level corresponding to the level of ensilage in the silo.

In order to maintain a clean access passage within silo chute 2, I have separated the interior of chute 2 into two separate compartments or passages by means of a dividing wall 30 which extends vertically over substantially the entire height of chute 2. As is conventional, silo chute 2 takes the form of a generally U-shaped housing member having opposed wall segments 2b and 2c extending vertically along side wall portions 6 of silo 1 in abutting relation therewith. Silo chute locking tongues 2a extend vertically along the inner edges of opposed, side wall segments 2b and 2c. Housing member 2 is disposed in overlying relation to vertically aligned door frames 8 and cooperates with side wall portion 6 of silo 1 to define an upright, enclosed chute. In the embodiment of the double passage silo chute shown in FIGS. 1 through 4, dividing wall 30 extends transversely of chute 2 between opposed side wall segments 2b and 2c. Dividing wall 30 is oriented substantially parallel to silo side wall portion 6 and cooperates with the outer, closed end of U-shaped silo housing 2 to define therewith a first, ensilage discharge passage 32. As most clearly appears in FIGS. 2 and 3, ensilage discharge passage 32 is located remote from silo side wall portion 6 adjacent the curved end of chute 2. A second, access passage 34 is formed immediately adjacent silo wall portion 6 between upright dividing wall 30 and side wall portion 6, the lateral extremities of access passage 34 being defined by silo chute side wall segments 2b and 2c. The length of silo chute 2 extending in a direction at right angles to silo side wall portion 6 is made greater than the normal length of a silo chute in order that access passage 34 will be large enough to accommodate a workman, with the outer end of silo chute 2 being utilized as an ensilage discharge passage. It will be apparent, that with access passage 34 located immediately adjacent to silo side wall portion 6, service doors 10 will be located within the confines of access passage 34. Thus, a workman may climb up within access passage 34 using the vertically spaced ladder rungs 18b and 18c mounted on doors 10.

Dividing wall 30 may be constructed in various ways. In the embodiment of my invention shown in FIGS. 1 through 4, the dividing wall is erected transversely of silo chute 2 by using a pair of elongated, upright right angle frame members 36 which are secured to opposed side wall segments 2b and 2c of silo chute 2 by means of fasteners 38. Secured between right angle uprights 36 at vertically spaced locations thereon are a plurality of transverse connecting members 40 which define therebetween a plurality of vertically spaced openings in dividing wall 30 directly opposite silo wall portion 6 within which access doors 10 are located. Each of the vertically spaced openings in dividing wall 30 between cross members 40 is normally closed by doors which may be moved to an open position for the purpose of placing ensilage discharge passage 32 in flow communication with the interior of silo 1 through one of the opposed openings defined by door frames 8. The discharge opening between each pair of vertically spaced cross members 40 in dividing wall 30 is normally closed by a door assembly comprised of a pair of lower and upper door panels 42 and 43. Each of these door panels is hingedly connected to right angle uprights 36 for pivotal movement on horizontal axes defined by hinges 42a and 43a respectively. Each of the lower door panels 42 is hingedly attached to dividing wall uprights 26 along its lower or bottom edge by means of horizontally extending hinges 42a; and each of the upper door panels 43 is hingedly attached to dividing wall uprights 36 along its upper edge by means of horizontally extending hinges 43a. As is clearly indicated in FIGS. 2 and 3, lower door panels 42 are offset inwardly towards silo 1 with respect to upper door panels 43 and are swingable downwardly about their hinge pins 42a to an open position. Door panels 42 are normally held closed by means of spring detents 44 on their opposed side edges which are compressed when doors 42 are swung inwardly past uprights 36 and which spring into spaced apart apertures 46 in uprights 36 to lock door panels 43 closed. When lower door panels 42 are swung to their upwardly closed positions and locked in place by means of detents 44, they will overlie upper door panels 43 and hold these upper door panels in a closed position. Lower door panels 42 are of sufficient length, that when they are swung inwardly and downwardly to their open positions by grasping handles 48 thereon, they will extend all of the way across access passage 34 and engage one of the horizontal frame members 8a of a door frame 8 in silo wall portion 6. Door panels 42 and 43 are so located vertically with respect to door frames 8, that when one of the door panels 43 is swung downwardly to its open position, its upper end will be in engagement with a horizontal frame member 8a of one of the door frames 8 in the manner shown in FIGS. 2 and 3, with the panel 42 inclined downwardly and outwardly from silo 1 towards discharge passage 32. In order to discharge ensilage from silo 1, one of the service doors 10 at the desired discharge level is opened, and the opposed door panel 42 is swung inwardly to rest on the lower, horizontal door frame for the door 10 which has been opened. Thus, door panels 42 may be selectively utilized as conduit means to place discharge passage 32 in flow communication with the interior of silo 1 through one of the opposed door frames 8 at a level corresponding to the level of discharge chute 28. Discharge chute 28 is progressively lowered within silo 1 as the level of ensilage drops. The downwardly and outwardly inclined position which door panels 42 assume when opened facilitates the downward and outward flow of ensilage from silo 1 into discharge passage 32.

Upper door panels 43 may be swung upwardly and inwardly towards silo 1 to a blocking position extending generally transversely between dividing wall 30 and side wall portion 6 of silo 1 in overlying relation to an open, lower door panel 42. Each of the upper door panels 43 may be made long enough to extend across access opening 34 so as to engage the horizontal member 8a of a door frame 8 immediately above the door frame on which opened door panel 42 is resting. Alternatively, door panels 43 may be made shorter than panels 42, and provided with a removable extension member 50 of sufficient length to bridge the gap between the outer end of each of the upper panels 43 and one of the opposed door frames 8 in silo wall portion 6. In the embodiment shown in FIGS. 1 and 2, removable extension 50 takes the form of a sleeve which is slidably attached to the outer end of one of the opened, upper door panels 43 and engaged at its outer end on one of the horizontal door frame members 8a. Extension 50 is provided with tabs 51 on its outer end which are shaped to engage the edge of one of the door frame cross members 8 in the manner illustrated in FIG. 2. With one pair of lower and upper door panels 42 and 43 opened and engaging door frames 8 of silo 1 in the manner shown in FIGS. 1 and 2, the opened pair of door panels will define the top and bottom walls of a flow conduit extending between side wall portion 6 of silo 1 and discharge passage 32. The opening of one of the upper door panels 43 to a blocking position above one of the opened door panels 42 serves to prevent the flow of ensilage upwardly into access passage 34 and the resultant contamination of this passage.

In operation, the unloading of silo 1 can be progressively accomplished by a workman climbing up within access passage 34, utilizing ladder rungs 18b and 18c, to open a pair of adjacent service doors 10, the lowermost one of the opened doors 10 being utilized to discharge ensilage by means of a silo unloader of known design. After unloader discharge chute 28 is set at the proper level for discharge through one of the door frames 8, the opposed door panel 42 is swung downwardly, and its corresponding, upper panel 43 is swung upwardly to define therebetween a flow conduit through which ensilage is blown from silo 1 into discharge passage 32. By virtue of this arrangement, access passage 34 is maintained substantially clean for the workmen who must periodically climb up and down within this passage to adjust and service the unloader as well as to attend to the progressive steps of the unloading operation. Ensilage is discharged downwardly through discharge passage 32, and flows outwardly from the bottom end of double passage silo chute 2.

In FIGS. 5 and 6 I have shown an alternative embodiment of my double passage silo chute utilizing a different type of conduit means for directing the flow of ensilage from silo 1 into discharge passage 32. In this embodiment of my invention, the construction of silo 1, its door frames 8 and service doors 10 is identical to that shown in FIGS. 1 through 4. Also, silo chute 2 is of the same construction disclosed with respect to FIGS. 1 through 4, and is attached to silo wall 6 in the same way. Dividing wall 52 is oriented within silo chute 2 in the same manner as disclosed with respect to dividing wall 30 to form an ensilage discharge passage 32 adjacent the remote, curved or closed outer end of silo chute 2, and an access passage 34 immediately adjacent silo service doors 10. In this embodiment of the invention, dividing wall 52 is formed by securing a plurality of sheet metal panel sections 53 one on top of the other to form a substantially upright dividing wall. Each of the dividing wall panel sections 53 has peripheral flanges 53a along each of its four edges which are turned at right angles to the main plane of the panel section. Adjacent, horizontally extending panel flanges 53a of adjacent panel sections 53 are brought into abutting engagement and fastened together by means of bolts 54 in order to construct the upright dividing wall. The vertically extending flanges 53a on each of the panel sections 53 are secured to opposed side walls 2b and 2c of silo chute 2 by means of fasteners 56. Each of the dividing wall panels 53 has a hinged door 58 therein which may be opened to provide a discharge opening in dividing wall 52. Doors 58 are vertically spaced, in alignment with each other. Each of the doors 58 is normally held in a closed position by means of a rotatable latch 60 having a locking detent 61 thereon to engage the outer or back face of door panels 53, as illustrated in FIG. 6. Each of the dividing wall doors 58 is hingedly supported along its bottom edge by means of horizontally extending hinge pins 62 inserted through outwardly projecting, apertured ears 64 attached to panels 53. Thus, each of the doors 58 may be opened by rotating its latch 60, and then swung downwardly to a fully opened position wherein it is suspended downwardly along dividing wall 52 as illustrated in FIGS. 5 and 6. A separate, tubular conduit 66 may be utilized to conduct ensilage from the interior of silo 1 to discharge passage 32. Tubular conduit 66 may be made of plastic or sheet metal, or other suitable material, and preferably assumes the downwardly inclined configuration illustrated in order to faciliate the flow of ensilage from silo 1 into discharge passage 32. Conduit 66 is of sufficient length to extend fully across access passage 34 from silo wall 6 to silo chute dividing wall 52. On its inner end, tubular conduit 66 is provided with a peripheral flange 68 constructed to restrainably engage door frames 8 in silo wall 6. The inner end of tubular conduit 66 is sized to fit within one of the door frame openings 8 with sufficient clearance space as illustrated in FIG. 6 so as to permit the manipulation of conduit 66 to insert its outer end through an opposed discharge opening in dividing wall 52 provided by opening one of the dividing wall doors 58. The outlet of forward end of conduit 66 is defined by a peripheral flange ring 70 sized to snuggly fit within one of the discharge openings provided in dividing wall 52 by the opening of one of the doors 58. Flange ring 70 is substantially square, and extends forwardly at such an angle with respect to the downwardly inclined, outer end of conduit 66 that its upper end lower flange segments will project substantially horizontally, and its side flange segments vertically to conform to the contour of the discharge opening formed in dividing wall 52. In this manner, a relatively snug fit is provided between outlet 70 of conduit 66 and the discharge opening provided in dividing wall 52. Dividing wall doors 58 are so located, vertically, with respect to vertically spaced door frames 8 on silo wall portion 6 that when tubular conduit 66 is inserted through one of the door frame openings 8 and into access passage 34, its outlet end 70 will be angled to fit into an opposed door opening in dividing wall 52.

In operation, a workman will climb up inside access passage 34 utilizing ladder rungs 18b and 18c on service doors 10, and obtain access to the interior of silo 1 through one of the doors 10 in the manner described above. After adjusting or setting the level of the unloader discharge chute 28, the workman will open one of the silo service doors 10 in line with discharge chute 28, and will also open an opposed door 58 in dividing wall 52. Tubular conduit 66 is then inserted from the inside of silo 1 through one of the door frame openings 8 and into and through access passage 34. Then, working within access passage 34 if required, the workman may insert the outlet end 70 of tubular conduit 66 within the aligned opening formed in dividing wall 52 by opening one of the dividing wall doors 58. Flange 68 on the inner end of tubular conduit 66 restrainably engages the inside face of one of the door frames 8, to assist in holding tubular conduit 66 in place. As the level of ensilage within silo 1 drops, conduit 66 is progressively lowered, and reset in place between one of the silo door frame openings 8, and an opposed opening in dividing wall 52.

In FIGS. 7, 8 and 9 I have illustrated still another embodiment of my double passage silo chute. In this version, upright dividing wall 72 is oriented substantially perpendicular to silo wall portion 6 and parallel to side wall segments 2b and 2c of silo chute 2. Dividing wall 72 extends between side wall portion 6 of silo 1 and the outer, curved wall portion of U-shaped silo chute 2, thereby dividing chute 2 into a first, ensilage discharge passage 74 and an access passage 76. With dividing wall 72 oriented in the manner illustrated in FIG. 7, parallel to chute side wall segments 2b and 2c, both ensilage discharge passage 74 and access passage 76 will have a vertical wall segment common with side wall portion 6 of silo 1. A plurality of vertically spaced discharge openings 78 are provided in silo wall portion 6 within discharge passage 74, each of these discharge openings being normally closed by a removable or hinged door 79. One of the doors 79 is shown in a removed or open position in FIG. 7 for the discharge of ensilage therethrough into discharge passage 74. A plurality of vertically spaced door frame openings 8 are provided in silo wall portion 6, adjacent to discharge opening 78, in the same manner as described above with respect to FIGS. 1 through 4. For reasons hereinafter explained, doors 10 are hingedly supported on door frames 8 for swinging movement inwardly of silo 1 from the opposite side of door frames 8 than that illustrated in FIGS. 2 and 4. Thus, as is shown in FIG. 7, hinge sleeves 14 for vertical hinge bar segments 18a of bar assemblies 18 are located on the left, upright frame of door frame assemblies 8, when viewing silo wall 6 from the front in FIG. 7.

The mounting arrangement for both silo chute 2 and dividing wall 72 is different from that disclosed above with respect to FIGS. 1 through 4. The inner, upright edges of silo chute side wall segments 2b and 2c are formed to provide substantially U-shaped mounting channels 80 and 81. These channels are disposed in abutting relation with the outside face of silo wall portion 6. Elongated, upright support member 82 are affixed to the outside faces of silo chute wall segment 2b and 2c at their inner ends, support members 82 being angled as shown to abut against the outside face of silo wall portion 6. Upright support members 82 are notched as shown to fit over silo reinforcing hoops 26, and serve to reinforce silo chute 2, and to maintain a tight, sealing mounting of silo chute 2 against wall 6 of the silo 1. Both silo chute 2, and dividing wall 72 are attached to silo wall portion 6 by means of a J-bolt assembly illustrated in FIG. 9. This coupling assembly includes a J-shaped bolt 84, a mounting bracket 85, washer 86, and nut 87 for the threaded, outer end of bolt 84. The J-bolt assemblies are utilized in the same manner for attaching both silo chute 2 and dividing wall 72 to side wall portion 6 of silo 1, the particular mounting arrangement for dividing wall 72 utilizing the J-bolt assembly being illustrated in FIG. 8. Dividing wall 72 is also provided with a U-shaped mounting channel, designated by reference numeral 88, along its upright, inner edge. Mounting bracket 85 is interlocked with U-shaped channel 88 of dividing wall 72 in the manner illustrated in FIG. 8, the opposite, notched end 85a of bracket 85 being brought to bear against one of the silo support hoops 26. The hooked end of J-bolt 84 is hooked around the respective hoop 26, and the threaded end of bolt 84 is inserted through aperture 85b in bracket 85. After washer 86 is placed on bolt 84, nut 87 is tightly threaded onto the outer end of bolt 84 to draw dividing wall 72 and its U-shaped mounting channel 88 tightly against silo hoop 26. A plurality of vertically shaped J-bolt mounting assemblies are utilized along the length of dividing wall mounting channel 88, as well as along the length of silo chute mounting channels 80 and 81, to firmly attach silo chute 2 and dividing wall 72 to silo wall portion 6 over their entire length. Dividing wall 72 is supported at its inner end by an upright member 90 which is attached to dividing wall 72 by fasteners as shown, and which is also notched along its inner, upright edge to fit over silo hoops 26. At its outer, upright edge, dividing wall 72 is provided with a mounting flange 92 which is firmly attached to the curved, outer end of silo chute 2 by means of fasteners 94.

Dividing wall 72 is provided with a plurality of vertically spaced doors 96 which are attached to wall 72 by hinges 98 for swinging movement inwardly into access passage 76, towards silo wall segment 2c. Each of the dividing wall doors 96 is normally held in a closed position by means of a rotatable latch 100, of similar operation and construction to that illustrated with respect to latches 60, 61 in FIGS. 5 and 6. When unlatched and swung downwardly into access passage 76 to their open positions, doors 96 provide openings through which a workman may reach from access passage 76 into ensilage passage 74 to open one of the doors 79 closing discharge openings 78. Access passage 76 functions in the same way as described above, to permit a workman to climb upwardly therein, utilizing ladder rungs 18b and 18c. Service doors 10 may be swung inwardly to permit a workman to obtain access to the interior of silo 1 for the purpose of adjusting or servicing the silo unloader. Because hinge sleeves 14 for doors 10 are mounted on the left side of door frames 8, doors 10 will swing inwardly in a direction away from ensilage discharge openings 78, so as to pose no obstacle to the servicing of the silo unloader or the adjustment of unloader discharge tube 28 which will be located in alignment with vertically spaced discharge openings 78. In order to discharge ensilage from silo 1 into discharge passage 74, it is only necessary for a workman to climb upwardly within access passage 76, utilizing ladder rungs 18b and 18c. The workman will unlatch and open one of the doors 96 in dividing wall 72, and utilize the resulting opening in dividing wall 72 to reach through discharge passage 74 to open one of the doors 79 over discharge openings 78 in silo wall portion 6. Successively lower doors are opened in order to provide for the discharge of ensilage through one of the openings 78 at a level corresponding to that at which the silo unloader discharge chute 28 is operating. Because ensilage is always discharged only through discharge passage 74, access passage 76 is maintained clean for workmen.

It will be appreciated that with each of the three embodiments of my double passage silo chute disclosed herein, a separate, clean access passage is maintained within the silo chute 2 through which servicemen may climb upwardly and downwardly as required to service the unloader and to make the adjustments as required to accomplish the discharge of ensilage at the desired operating level into a separate, discharge passage within the silo chute. I anticipated that various changes and modifications may be made in the size, shape, and structure of the double passage silo chute arrangements disclosed herein without departing from the spirit and scope of my invention as defined by the following claims. For example, an existing, installed silo chute could be modified to provide a double passage silo chute in accordance with my invention by simply installing a second, U-shaped housing member over the outer, curved end of the existing silo chute with the side walls of the U-shaped housing member abutting against and being attached to the outer end of the side walls of the existing silo chute. With such a construction, the outer, curved end of the existing silo chute would serve as the dividing wall, and door openings would be formed therein in order to provide discharge openings communicating with the discharge passage formed between the outer, curved wall of the additional, U-shaped housing member and the outer, curved wall of the existing silo chute. Such a "piggy-back" installation would provide a convenient means of forming double passage silo chutes on silo chutes already erected on silos.

I claim:

1. In combination with a silo, an improved chute structure comprising:
  a vertically extending silo of tubular configuration defined by upright side walls;
  a plurality of vertically spaced door openings in one side wall portion of said silo, said door openings being in vertical alignment with each other;
  a shiftable door covering each of said door openings;
  an elongated, generally U-shaped housing member extending vertically along said one side wall portion of said silo in abutting relation therewith, said U-shaped member being disposed in overlying relation to said door openings and cooperating with said side wall portion of said silo to define an upright chute;
  a vertical dividing wall extending over substantially the entire height of said chute between opposed wall segments thereof and dividing said chute into a first, ensilage discharge passage and a second, access passage of sufficient cross-sectional area to accommodate a workman, said door openings in said one side wall portion of said silo being located within the confines of said access passage;

a plurality of vertically spaced rungs within said access passage of said chute on one upright wall thereof to permit a person to climb up inside said access passage to obtain entry to the interior of the silo through said door openings;

a plurality of vertically spaced discharge openings in one wall segment of said discharge passage having doors in closing relation thereover which may be opened, whereby said openings in said one wall segment of said discharge passage may be selectively utilized to place said discharge passage in flow communication with the interior of said silo at desired levels therein; and transfer conduit means extending between one of said silo door openings and one of said discharge openings for conducting ensilage from the interior of said silo into said discharge passage, said transfer conduit means being adjustably operable at various vertical levels within said upright chute in cooperation with a selected one of said silo door openings.

2. A silo and chute structure as defined in claim 1 wherein:

said dividing wall is oriented substantially parallel to said one side wall portion of said silo and extends between the opposed, side wall segments of said U-shaped, housing member which abut against said silo at their inner, vertical edges, said dividing wall cooperating with the outer end of said U-shaped member remote from said one, side wall portion of said silo to define therewith said ensilage discharge passage, and said access passage being formed immediately adjacent said silo between said dividing wall and said one side wall portion of said silo; and said plurality of vertically spaced openings in said discharge passage are formed in said dividing wall opposite said plurality of vertically spaced door openings in said side wall portion of said silo.

3. A silo and chute structure as defined in claim 2 wherein:

said conduit means comprises a tubular conduit of such a length as to extend across said access passage between said side wall portion of said silo and said dividing wall, said tubular conduit having an outer end portion sized to fit within one of said discharge openings in said dividing wall and further having mounting means on its inner end constructed to restrainably engage one of said door openings in said side wall portion of said silo.

4. A silo and chute structure as defined in claim 2 wherein:

said doors over said discharge openings in said dividing wall are hinged on horizontal axes and are of sufficient length along the vertical dimension of said dividing wall as to engage one of said opposed door openings in said side wall portion of said silo when swung inwardly towards said silo, whereby said doors over said discharge openings serve as said conduit means when swung inwardly into engagement with one of said door openings in said side wall portion of said silo.

5. A silo and chute structure as defined in claim 4 wherein:

each of said discharge opening doors is comprised of a pair of lower and upper panels hinged along horizontal axes, said lower panel being hingedly attached to said dividing wall along its bottom edge and of sufficient length to engage an opposed door opening in said one side wall portion of said silo when swung inwardly and downwardly towards said silo, and each of said upper door panels being hingedly attached to said dividing wall along their upper edges and swingable upwardly and inwardly towards said silo to a blocking position extending generally transversely between said one side wall portion of said silo and said dividing wall, whereby each pair of said lower and upper door panels defines a bottom and a top wall segment respectively of said conduit means extending between said side wall portion of said silo and said discharge passage.

6. A silo and chute structure as defined in claim 5 wherein:

each of said upper panels of said discharge opening doors is shorter than the space between said one side wall portion of said silo and said dividing wall, and further including an extension member removably attached to one of said upper panels and of sufficient length to bridge the gap between the outer end of said upper panel and said one side wall portion of said silo when said upper panel is swung inwardly towards said silo to permit said upper panel to restrainably engage said one side wall portion of said silo when said upper panel is in said inwardly swung, blocking position.

7. A silo and chute structure as defined in claim 1 wherein:

said dividing wall is oriented substantially perpendicular to said one side wall portion of said silo and extends between said one side wall portion and the outer wall segment of said U-shaped housing member remote from said silo, whereby both said discharge passage and said access passage have a vertical wall segment common with said one side wall portion of said silo, said plurality of discharge openings in said discharge passage being formed in said one side wall portion of said silo adjacent said plurality of vertically spaced door openings therein.

8. A double passage silo chute for installation on a silo comprising:

an elongated, substantially U-shaped housing member adapted to be mounted in an upright position on a silo wall in overlying relation to a plurality of vertically spaced and aligned access openings in the silo wall;

an elongated, substantially planar dividing wall extending parallel to the open side of said U-shaped housing member between opposed side wall segments of said housing member over substantially the entire height thereof, said dividing wall separating the interior of said housing member into an ensilage discharge passage and an access passage of sufficient cross-sectional area to accommodate a man therein, said discharge passage being defined between said dividing wall and the closed side of said U-shaped housing member opposite its open side; and a plurality of vertically spaced discharge openings in direct vertical alignment in said dividing wall, each of said openings being closed by a door movable to an open position.

9. A double passage silo chute as defined in claim 8 wherein:

each of said discharge opening doors is hingedly attached to said dividing wall for swinging movement about a horizontal axis.

10. In combination with a silo, an improved, double passage chute structure comprising:

a vertically extending silo of tubular configuration defined by upright side walls;

a plurality of vertically spaced door openings in one side wall portion of said silo, said door openings being in vertical alignment with each other;

an elongated, generally U-shaped housing member extending vertically along said one side wall portion of said silo in abutting relation therewith, said U-shaped member being disposed in overlying relation to said door openings and cooperating with said side wall portion of said silo to define an upright chute;

wall means extending vertically within said upright chute and dividing said chute into a first, ensilage discharge passage and a second, access passage, said door openings being located within the confines of said access passage; and transfer conduit means extending between said discharge passage and one of said door openings in said one side wall portion of the silo, said transfer conduit means having a receiving end in flow communication with the interior of the silo.

11. A silo and chute structure as defined in claim 10 wherein:

said transfer conduit means is in the form of a tubular conduit having a receiving end fitting snugly against one of said door openings in sealing contact therewith.

* * * * *